United States Patent
Gilbreath et al.

(10) Patent No.: US 8,746,751 B2
(45) Date of Patent: Jun. 10, 2014

(54) QUICK CONNECT COUPLING SYSTEMS WITH INSERT

(75) Inventors: Donald R. Gilbreath, Castle Rock, CO (US); Jonathan Clark Swift, Denver, CO (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 13/338,309

(22) Filed: Dec. 28, 2011

(65) Prior Publication Data

US 2012/0133127 A1    May 31, 2012

Related U.S. Application Data

(63) Continuation-in-part of application No. 11/377,724, filed on Mar. 16, 2006.

(51) Int. Cl.
    *F16L 37/00*    (2006.01)

(52) U.S. Cl.
    USPC .......................... 285/321; 285/314; 285/277

(58) Field of Classification Search
    USPC .......................................... 285/321, 314, 277
    See application file for complete search history.

(56) References Cited

U.S. PATENT DOCUMENTS

| | | | | |
|---|---|---|---|---|
| 2,443,394 A * | 6/1948 | Le Clair | | 285/259 |
| 2,935,343 A * | 5/1960 | Ellis | | 285/321 |
| 3,948,548 A * | 4/1976 | Voss | | 285/321 |
| 4,063,760 A * | 12/1977 | Moreiras | | 285/321 |
| 4,105,226 A * | 8/1978 | Frey et al. | | 285/321 |
| 4,133,564 A * | 1/1979 | Sarson et al. | | 285/321 |
| 4,135,745 A * | 1/1979 | Dehar | | 285/319 |
| 4,191,408 A * | 3/1980 | Acker | | 285/321 |
| 4,193,616 A * | 3/1980 | Sarson et al. | | 285/321 |
| 4,294,473 A * | 10/1981 | Ekman | | 285/321 |
| 4,448,447 A * | 5/1984 | Funk et al. | | 285/321 |
| 4,640,534 A * | 2/1987 | Hoskins et al. | | 285/321 |
| 4,645,245 A * | 2/1987 | Cunningham | | 285/321 |
| 4,648,634 A * | 3/1987 | Kelch | | 285/356 |
| 4,842,309 A * | 6/1989 | LaVene et al. | | 285/319 |
| 4,863,202 A * | 9/1989 | Oldford | | 285/321 |
| 4,906,031 A * | 3/1990 | Vyse | | 285/318 |
| 5,553,895 A * | 9/1996 | Karl et al. | | 285/39 |
| 5,570,910 A * | 11/1996 | Highlen | | 285/308 |
| 6,554,320 B2 * | 4/2003 | Cresswell | | 285/39 |
| 6,588,805 B2 * | 7/2003 | Persohn et al. | | 285/305 |
| 6,604,760 B2 * | 8/2003 | Cresswell et al. | | 285/305 |
| 6,749,231 B2 * | 6/2004 | LeMay et al. | | 285/93 |
| 7,014,215 B2 * | 3/2006 | Cooper et al. | | 285/247 |
| 7,631,905 B2 * | 12/2009 | McGee et al. | | 285/321 |
| 7,681,927 B2 * | 3/2010 | Olson | | 285/353 |
| 8,028,392 B2 * | 10/2011 | Swift et al. | | 285/308 |
| 2003/0001386 A1 * | 1/2003 | Cresswell et al. | | 285/305 |

* cited by examiner

*Primary Examiner* — David E Bochna
(74) *Attorney, Agent, or Firm* — Paul N. Dunlap, Esq.; Jeffrey A. Thurnau, Esq.

(57) ABSTRACT

A threaded adapter is part of a quick-to-connect and quick-to-disconnect flexible hose coupling system. The adapter may provide a low-profile securement and seal between the port and the stem portion of the quick connect coupling. The adapter in combination with the fluid valve block orifice provides a seal that is further down in the valve block than the location of seals provided by other fluid couplings. Without relying on wrenching flats, the adapter also provides effective access to the hoses for repair and therefore is a cost saving device. The adapter may be a safe, reliable, easy to connect and disconnect component in a hydraulic system and is adaptable to accommodate any coupling including those in high and low pressure fluid and other systems.

15 Claims, 3 Drawing Sheets

QUICK CONNECT COUPLING SYSTEMS WITH INSERT

CROSS REFERENCE TO RELATED APPLICATIONS

This application is a continuation in part of U.S. patent application Ser. No. 11/377,724 entitled "QUICK CONNECT COUPLING", filed on Mar. 16, 2006, the disclosure of which is hereby incorporated for all purposes.

BACKGROUND

This disclosure relates generally to quick connect couplers, more particularly to insert adapters for quick connect and disconnect couplers, and specifically to a threaded insert adapter for quick connect couplers with sealing on the interior of the insert.

Hydraulic systems including hydraulic hoses, manifolds (hose blocks), and couplings, operate at very high pressures. When storage space of the hydraulic system is limited and the hydraulic hose is not readily accessible, human risk and error can occur. A low-profile adapter would increase maintenance accessibility, increasing the overall safety of the system. Additionally, leaks can typically occur throughout the hydraulic system, compromising the efficiency of the system and potentially causing human injury. While fast connection and disconnection of the respective hydraulic components creates increased convenience and efficiency of assembly, a lower profile connection that is also very reliable and provides a tight seal would be highly advantageous.

In the past, problems that have resulted from time consuming repair of leaks within a hydraulic system have included unmitigated, excessive fluid flow, resulting in increased risk to the environment, system and operator.

In those instances, quick connect couplings have been used. The Gates Corporation's Quicklok™ threadless hydraulic coupling reduces leaks within high pressure fluid systems and increases assembly line productivity. Repair time can be substantial in systems using traditional threaded fasteners. The quick connect system can decrease maintenance time and reduce potential dangers resulting from cross-threading. The Quicklok couplings comprise a female connection portion, disposed within the block, and a male connection portion, received by the female portion, to which hydraulic hose is attached. The male and female portions join in a sealing and locking manner upon being pushed together. The Quicklok couplings further comprise threads and wrench mating flats adapted to disconnect the hose from a block.

Other quick-to-connect/disconnect couplings that mate hydraulic hoses to blocks are known. Such couplings typically protrude significantly from the block. In tight spaces, their height renders maintenance of the hydraulic system very difficult. The couplings may also comprise insertable clips or rings that can easily break, posing high risk to the system and operators should a leak result from this breakage.

One example of a quick-to-connect coupling that mates a block to a hose can be found in U.S. Pat. No. 6,129,390 to Ohlsson. Ohlsson attempts to provide a quick connect/disconnect coupling between a female connector and a male connector for connecting a high pressure line to a block. The goal of this system is to provide a female connector with locking means to effect reliable connection during large hydraulic pressures. Another object of Ohlsson is to provide a method and tool for assembly of the coupling so that assembly of the coupling is efficient. However, the Ohlsson system encompasses the use of blocking means, which comprise locking hooks. The somewhat flimsy hooks may be unreliable. In addition, Ohlsson's coupling takes up a substantial amount of space. Furthermore, the Ohlsson coupling requires tools for removal. The Ohlsson coupling comprises plastic removable clips that have the potential to perform poorly under high pressures. The hooks easily break during connection and disconnection of the female and male connectors. Another disadvantage of Ohlsson's coupling is that it is not leak proof due to its number of tiny, plastic parts.

SUMMARY

The present disclosure is directed to systems and methods which provide a deep, reliable seal in a low-profile quick-to-connect hose coupling that connects flexible hydraulic hose to a hydraulic valve block. An example of a low-profile system that provides a superior, deep seal between the block and the coupling (or between the block and the hose) can be seen in embodiments of the present disclosure.

The present disclosure is directed to systems and methods which provide a low-profile quick-to-connect coupling that connects a hose stem to a block. In one embodiment, the system includes an insert having external threads and adapted to be threaded into machined fluid port in a block, the insert defining an inner port comprising a rear cylinder adapted to support a retaining ring; a first intermediate cylinder; a locking groove adapted to support a retaining ring; a second intermediate cylinder; and, a first transition ramp, wherein the annular groove is intermediate to the rear cylinder and to the second intermediate cylinder, and wherein the first transition ramp extends from the second intermediate cylinder to the first intermediate cylinder. The system further includes a quick connect stem adapted to be received by the insert, the stem comprising a release sleeve; and a retaining clip disposed in the locking groove, the clip adapted to be received by the locking groove when the stem is coupled with the inner port.

Current hydraulic systems can undergo damaging leaks in any part of the system. A leak can occur between the fluid port of the hose block and the coupling. Such a leak may go undetected until catastrophic failure occurs. Another potentially hazardous leak location is between a female portion of the coupling, located within the block, and the male portion of the coupling, the stem, to which the hydraulic hose is attached. Should the system experience a leak, it is better for the leak to occur as low down or as early in the system as possible. The further out the leak, the closer the leak is to an operator. Therefore it would be of benefit to create the seal in the block itself. Speedy repairs are also highly desired; therefore it would also be beneficial to provide a system that did not require wrenching flats to disassemble. The absence of wrenching flats would also increase elbow room for maintenance and connection, which would improve efficiency and decrease down time as the dimension of the female portion that extends from the block to the hose would be reduced (the profile of the female portion, in relation to the block, would be decreased).

There is no provision in currently available hose couplings for a quick to connect/disconnect hose/block system that is easy to utilize, low in profile, and provides a deep, reliable seal that is safer than seals provided by currently available couplings. The present threaded insert-style adapter provides a seal deeper than those seals provided by other, currently available hose/block adapters. The insert-style adapter comprises a very low-profile in relation to the hose block, increasing access space to the block and the connectors and thereby increasing efficiency of maintenance. The insert-style adapter is very easy to assemble and remove, as some embodiments may not require wrenching flats in order to do so.

Any type of connector can employ the threaded insert-style adapter. Examples of systems to which the threaded-insert style adapter can be attached include the Gates product lines for mobile construction equipment: the Quick-Lok Direct™ (QLD) system and the Quick-Lok High™ (QLH) system. Both the QLD and QLH configurations are designed for hydraulic equipment applications using one and two-wire industry-standard SAE 100R1 and SAE 100R2 hoses. The QLH connection is designed for working pressures up to 5,000 psi and consists of a hose stem and adapter. The QLD connection, designed for working pressures up to 500 psi, is a releasable connection that allows for direct-to-block applications, eliminating the need for an adapter. These connections provide leak-free performance superior to other products currently available on the market. Both Gates Quick-Lok configurations provide torque-free, minimal force assembly without the use of tools. Inherent to their design is a built-in, critical safety feature: they cannot be accidentally or unintentionally disconnected. In addition to enhancing quick to connect/disconnect systems, the threaded insert-style adapter can also be used in threaded systems/couplings.

An important advantage of the various embodiments of the present disclosure is that the threaded insert-style adapter provides a seal that is located as far down into the block (and therefore fluid path) as possible. The threaded insert-style adapter is held in place securely, with just enough surface area protruding from the block to effect tits easy removal with or without the use of wrenching flats. Another embodiment of the present disclosure provides an adapter having a surface that is flush with the outside surface of the block. This embodiment does not protrude from the block at all, yet still provides very effective protection against leaks. All of the various embodiments of the present disclosure provide secure protection against hydraulic system leaks, and can be used in combination with previously existing fluid ports. Conversely, all embodiments of the present disclosure nicely combine with blocks whose ports can easily be machined in a retrofit manner. Such an assembly is simple to manufacture and implement at time of manufacture or as a retrofit, and are lightweight, elegant, and effective. Another distinct advantage of the present disclosure is that the embodiments of the present disclosure accommodate all types of couplings, including quick to connect/disconnect couplings, threaded couplings, viscous couplings, fan couplings, and all other types of couplings.

Thus, in accordance with embodiments of the present disclosure a fluid coupling adapter may comprise, an insert adapted to be threaded into an existing hose block, the insert defining a widened thread section, an inner port and an annular clip groove, a clip disposed in the annular clip groove disposed about a quick connect stem, at least partially within a circumferential clip groove defined by the stem. The clip may be adapted to be received by the circumferential clip groove when the stem is coupled with the inner port. The quick connect stem may be adapted to be received by the insert and existing hose block.

The stem may comprise a seal that is disposed about the stem and adapted to mate with a seal mating surface defined by the existing fluid port. This would provide a fluid tight seal when the stem is coupled with the inner port. The stem further may comprise a sleeve disposed about the stem. The sleeve may be deployable between a first position, capturing the clip in the circumferential clip groove, and a second position, releasing the clip from the circumferential clip groove. The stem may further comprise a resilient dust seal biasing the sleeve into the second position. In accordance with embodiments of the present disclosure, a first frustoconical ramp may be adapted to compress the clip into the circumferential clip groove of the stem when the stem is further inserted into the inner port in preparation of separating the stem from the inner port. The sleeve is adapted to radially retain the clip compressed in the annular groove for removal of the stem from the inner port. The seal may be disposed in a circumferential seal groove defined by the stem and the seal may comprise an o-ring. The seal may further comprise a seal backing disposed between the seal and clip.

In accordance with embodiments of the present disclosure, a fluid coupling adapter may comprise an insert adapted to be threaded into an existing valve block, wherein the block may have a specially machined drill taper, the insert adapted to receive a stem that engages the insert and passes through the insert into an existing fluid orifice of the block. The drill taper may comprise a narrowing ramp that extends into the existing fluid orifice, wherein the ramp decreases in diameter as the ramp extends into the orifice creating a decreasing orifice diameter, the decrease in orifice diameter may thereby act as a stop for said stem. The insert may define an inner port and an annular clip groove and the stem may define a circumferential clip groove. The circumferential clip groove may, at least partially, receive the clip. The clip may be adapted to be received by the circumferential clip groove when the stem is coupled with the inner port. The stem may be adapted to be received by the insert and a tip portion of the stem may be received by the existing fluid orifice creating a seal between the male portion and the orifice of the valve block.

In accordance with embodiments of the present disclosure a method of providing a fluid tight seal between a male connection portion of a fluid coupling and an existing fluid valve block may comprise locking the male portion and the female portion together by providing a retaining mechanism, locking the insert into the port, and compressing seals that are disposed on the male connection portion against an orifice of the valve block. The retaining mechanism may comprise a retaining a clip disposed between the male and the female portions and locking the insert into the port may comprise threading the insert into the port. The seals are compressed by biasing the seals against a drill taper that is machined into the orifice of the fluid valve block. The seals are biased into an O-ring bore that has been machined inside the orifice.

In accordance with embodiments of the present disclosure, a hose coupling of the type including a fixture connection portion, a female connection portion, and a male connection portion may comprise the male connection portion having a leading support cylindrical surface, a following support cylindrical surface, and a transition surface intermediate therein between, the leading support cylindrical surface having a leading radius and the following support cylindrical surface having a following radius, the following radius being larger than the leading radius. The fixture connection portion may include a fixture end having external threads, and an adapter bore having an opening that is specially machined to include a ramp that extends into the bore, the ramp decreasing in diameter as the ramp extends into the bore, effecting a decreasing orifice diameter, the decrease in orifice diameter acts as a stop for the stem, the bore may engage the leading support cylindrical surface of the male portion allowing for a low-profile engagement of the female portion, the male portion, and the fixture, and the female connection portion including widened internal threads, a nut having an interior groove having a forward radial face and a rearward chamfer, with a lock ring in the form of an incomplete annulus having a substantially circular cross-section captured by the interior groove, and having a base-of-male receiving portion, a male abutment section located in the internal threads, and a conical flaring section. The transition surface of the hose coupling may be frustoconical. The transition surface may be contiguous with the leading support cylindrical surface and contiguous with the following support cylindrical surface.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The accompanying drawings, which are incorporated in and form part of the specification in which like numerals designate like parts, illustrate embodiments of the present disclosure and together with the description, serve to explain the principles of the disclosure. In the drawings.

DETAILED DESCRIPTION

Figure 1:
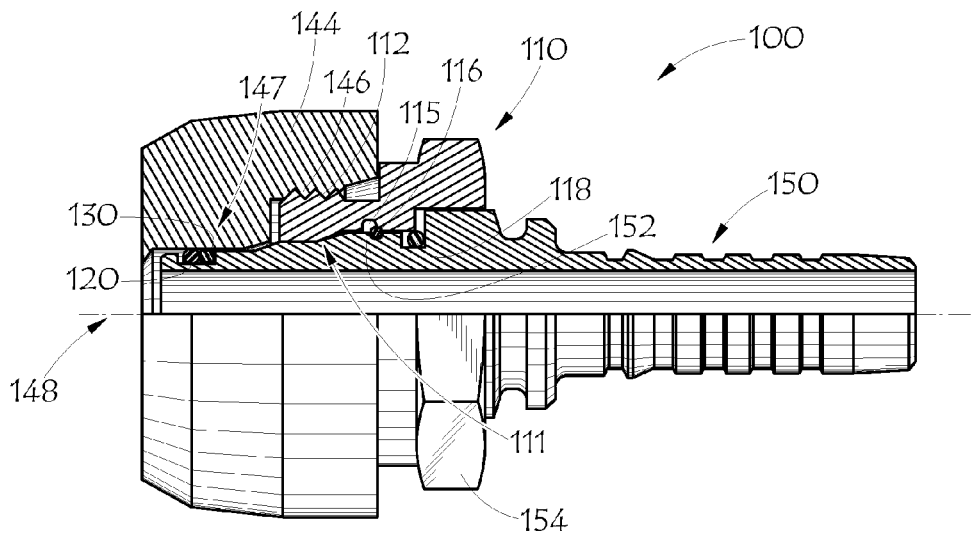
FIG. 1 is a partial cut-away view of a direct quick to connect coupling that provides a wider female connection insert with a wrenching portion allowing more of the male component to seal within the lower portions of the block, resulting in a low-profile coupling assembly.

Referring to FIG. 1, embodiment of the present disclosure shows a coupling system 100 configured to have the ability of a fluid coupling adapter or insert 110 to maintain a low profile providing increased access to the hydraulic system. In various embodiments of the present disclosure, the adapter 100 connects quick-to-connect and quick-to-disconnect fluid couplings to a valve or hose block 144. In FIG. 1, the insert 110 is threaded into an existing hose block 144, which may comprise various types of material. The adapter 110 can accommodate female and male connector portions of varying material, including those materials suited for high pressure hydraulic lines, among others. The adapter 100 may also be mated with valve blocks 144 of the same material as the adapter itself, or with other valve block material, including aluminum, or other suitable materials.

Referring to FIG. 1, the insert 110 comprises a threaded portion 112 which may be configured to mate with hose block threads 146, such that insert 110 may be coupled to hose block 144. Threaded portion 112 may be wider than the threaded portions of other coupling adapters currently on the market. The width of the threads may dictate a differently-sized thread; however, one that can still accommodate standard-sized orifices in typical hydraulic systems. The threaded portion 112 of the adapter 110 may be wide enough to accommodate integral sealing parts of the male/female connections. The result of completing the male/female lock or connection further into the valve block 144 is a neat, low-protruding ("low-profile") female connection portion. As such, the female's nut or wrenching flat portion 154 does not obstruct maintenance as is typically the case. Down time for maintenance is thereby decreased, and repair cost may decrease as a result.

Referring to FIG. 1, the insert portion 110 comprises an annular clip groove 115. A clip 116 may be disposed in the clip retaining portion or groove 152 and about a quick connect stem 150. The clip 116 at least in part resides within a circumferential clip groove 152 defined by the stein. When the stem 150 is mated with the inner port, the clip 116 adapts to be received by the annular clip groove 115, to couple stem 150 to insert 110 and block 144. The stem or male portion 150 of the connection assembly is adapted to be received by the female insert 110 and existing hose block 144. To disconnect, the system may have a release sleeve to disengage stein 150 from block 144.

A main seal 120 may be disposed about the stem 150 along with a backup ring 130. The main seal 120 may comprise any biasing material, and may comprise an o-ring or seal. The main seal 120 adapts to mate with a seal mating surface 147 defined by the existing fluid port. This results in a fluid tight seal when the stem 150 is coupled with the inner port of the block 144. The stem 150 may further comprise a resilient dust seal 118 that prevents contamination of the seal connection and the clip.

FIG. 1 also shows a specialized valve block 144 which may be configured to mate with an adapter 110 to create a seal low in the block 144. The seal is manifested in the orifice of the block 144. In this embodiment, the valve block may be machined post-manufacture, or the block may be formed in this configuration. The orifice can be widened at its opening in a tapering manner, so that when the male stem is inserted into the insert 110, the male stem is provided with a stop 148. The stem 150 passes through the insert 110 into the orifice, wherein the seal is created between a tip portion of the stem 150 and the orifice itself at main seal 120. An advantage of a seal located deeper within the block is that should a leak occur, it is easily detectable. Another advantage is the use of one seal instead of an adaptor seal and a stem seal. The drill taper may comprise a narrowing ramp that extends into the existing fluid orifice. Furthermore, the seal may be positioned on the hose block instead of the stem.

The insert 110 may comprise an inner port 111 and an annular clip groove 115. The stem 150 may define a circumferential clip groove 152. The circumferential clip groove 152 may, at least partially, receive the clip 116. The clip 116 may be adapted to be received by the circumferential clip groove 152 and annular clip grove 115 when the stem 150 is coupled with the inner port. The stem 150 may be adapted to be received by the insert 110. The advantage of the low seal is that a fluid tight seal between the male connection portion of a fluid coupling and an existing fluid valve block is easily created and in fact, can be retrofit in the field. In combination with a low-profile insert, this retrofit can be carried out easily.

In another embodiment, the lock ring 116 may comprise an incomplete annulus having a substantially circular cross-section. The lock ring is captured by the interior groove, and may comprise any material, including metal, plastic and other material.

Advantages of this embodiment may be that a hardened insert can be manufactured with a tight-toleranced groove. Furthermore, the block 244 may be made of a softer, less expensive material such as aluminum or cast iron. With this configuration the port contour may be more easily machined as it may be less complex, with only the O-ring bore having tight tolerances. This configuration may also have a smaller envelope than with other adaptors, and the port may be reparable.

Figure 2:
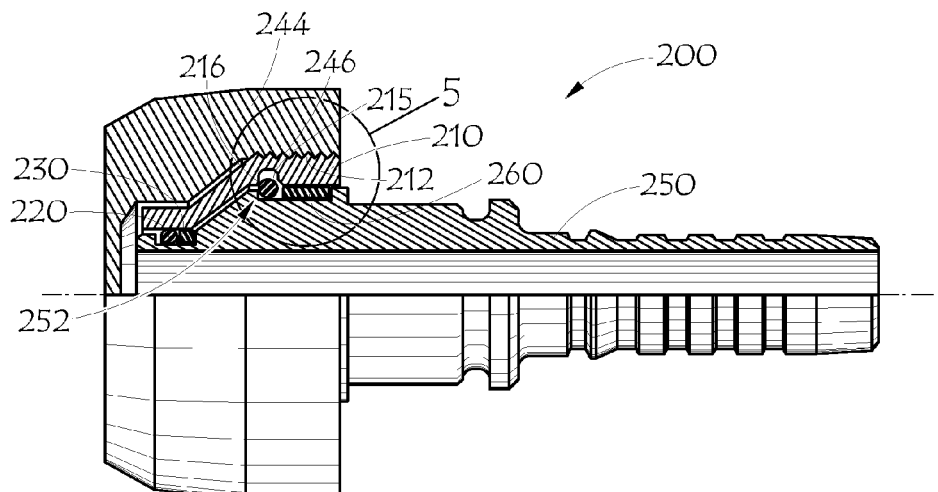
FIG. 2 is a partial cut-away view of a high pressure quick to connect and disconnect coupling wherein insert and the seal is provided within the block, deep within the orifice itself.

FIG. 2 may show a coupling system 200 according to an embodiment. System 200 may include an insert 210, a stem 250, and a block 244.

Insert 210 may include insert threads 212 as well and annular clip retaining portion 215. Threads 212 may be configured to couple to block threads 246 such that insert 210 may be rotated to couple to block 244 in a generally screw-type manner Clip groove 215 may be configured to receive clip 216 when the stem 250 is inserted through insert 210 and into block 244. As shown, insert 210 may reside generally completely within block 250.

In this embodiment, the stem 250 may include a sleeve 260. The sleeve 260, disposed about the stem 250, may have a first position, wherein the clip 216 in the circumferential clip groove 252 is captured in annular clip groove 215. The sleeve 260 may have a second position, wherein the clip 216 is released from the annular clip groove 215. The sleeve 260 is adapted to radially retain the clip 216 generally deflected into the annular groove 215 for removal of the stem 250 from the inner port of block 244.

The main seal 220 may comprise any type of seal that would carry out the intended use of the adapter 210, including an O-ring. The seal 220 is disposed in a circumferential seal groove 215. The seal groove is located on the stem 250.

A further advantage of this embodiment, in addition to those listed above for FIG. 1, may include no tight tolerances needed when manufacturing the port in block 244. This embodiment may also be manufactured with more threads to hold more pressure without leaking. Furthermore, the entire insert may fit inside the port, and this may be configured to fit inside a standard SAE-type port. Another advantage may also be that the seals of the system 200 are configured to be generally interior to the insert.

Figure 5:
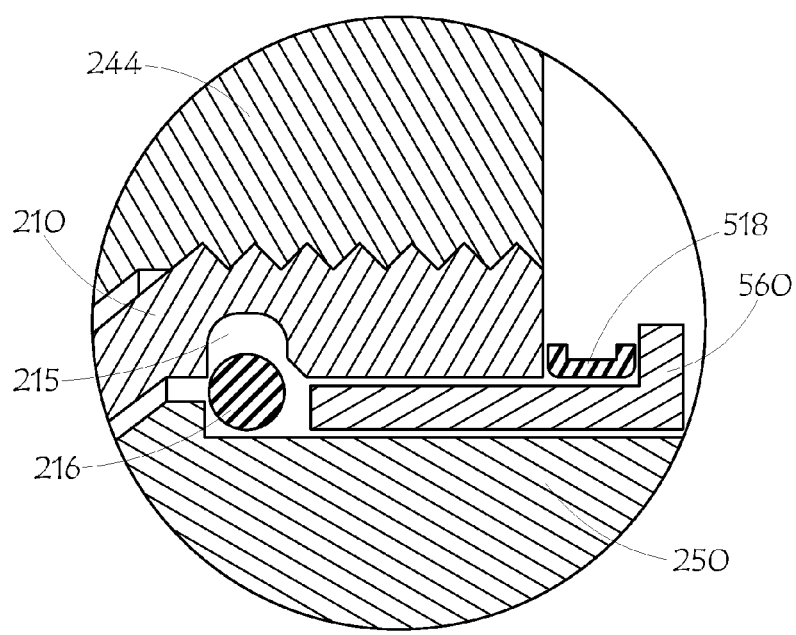
FIG. 5 is a partial cross sectional view of an alternate configuration of the circled region of FIG. 2.

FIG. 5 is a partial cross sectional view of an alternate configuration of the circled region of FIG. 2. In FIG. 5, sleeve 560 may be deployable between a first position, capturing clip 216 in circumferential clip groove 215, and a second position, releasing the clip from the circumferential clip groove. Stem 250 may further comprise resilient dust seal 518 biasing sleeve 560 into the second position. Dust seal 518 may also prevent contamination of the seal connection and the clip.

Figure 6:
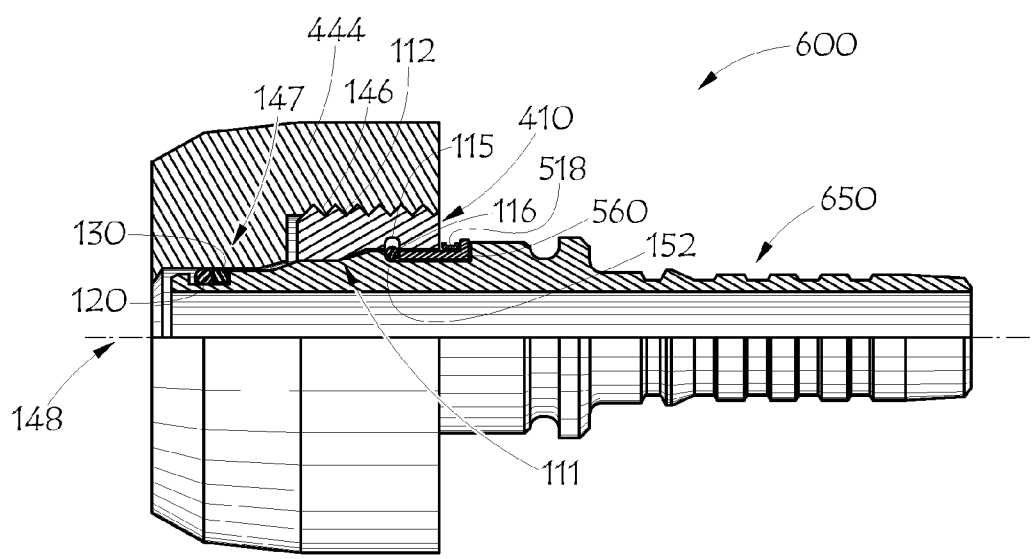
FIG. 6 is a partial cross sectional view of an embodiment of the invention.

FIG. 6 is a partial cross sectional view of an embodiment of the invention. In FIG. 6, coupling system 600 includes stem 650, port 444, and adapter 410 with additional parts identified as labeled and described in FIG. 4 combined with the sleeve 560 and dust seal 518 as described previously in FIG. 5.

Figure 3:
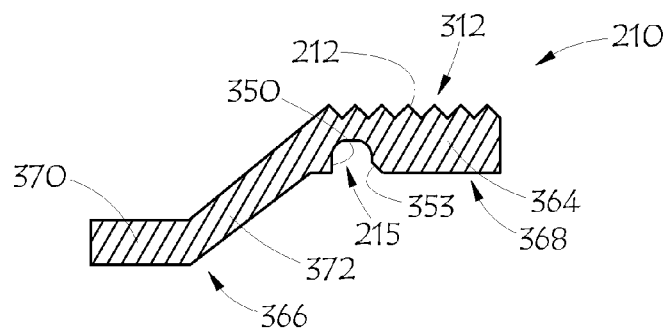
FIG. 3 is a plan view of an insert according to an embodiment.

In another embodiment of the present disclosure, a low-profile female insert is shown in FIG. 3. In this embodiment, a hose coupling may include a fixture connection portion 312, a female connection portion 368, and a male connection portion 366. The male connection portion 366 may comprise a leading support cylindrical section 370, a following support cylindrical section 364, and a transition section 372 therebetween. The transition section 372, as shown, is generally frustoconical. The radius of the leading support cylindrical section 370 may be smaller than the radius of the following support cylindrical section 364. The fixture connection portion 312 may include external threads 212 for a bore having an opening that is specially machined as described in FIG. 1. The decreasing diameter of the ramp as it extends into the orifice of the valve block provides a stop, and therefore safety mechanism, for the stem (not shown). The bore of the block (not shown) may engage the leading support cylindrical section of the male portion allowing for a low-profile engagement of the female portion, the male portion, and/or the stem. The block may engage the fixture connection portion. The fixture connection portion includes widened threads, allowing for a deeper mating within the block itself. The insert may comprise a nut or wrenching section. The female connection portion may have an interior groove 215. The groove 215 may have a forward radial face 350 and a rearward chamfer 353. The female connection portion may include a lock ring. The female connection portion may also include a receiving portion that abuts the base portion of the male. A male abutment section may be located in the threaded section of the female connection portion. The female may also include a conical flaring section. This configuration works for a quick to connect system.

Figure 4:
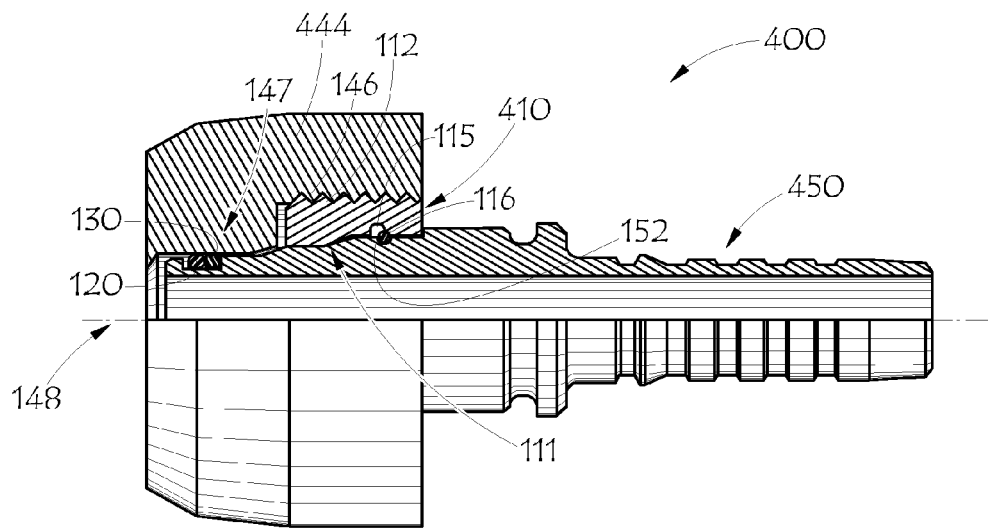
FIG. 4 is a partial cut-away view of a direct quick to connect coupling according to another embodiment of the invention.

The embodiment of FIG. 4 shows coupling system 400 having a low-profile insert 410, which is essentially the insert 210 of FIG. 1 cut off so that the entire insert 410 may fit inside the port of block 444. Stem 450 includes seal groove for a single seal 120 and its backup ring 130 as in FIG. 1. Other parts are also identified in FIG. 4 consistent with FIG. 1.

The embodiments of the present disclosure provide deep seals and low-profile configurations for any type of fluid coupling system, including quick to connect systems or other systems. The embodiments of the present disclosure accommodate the Quick-Lok High (QLH) connection system by Gates. The QLH is designed for working pressures up to 5,000 psi (350 bar) and consists of a hose stem and adapter. The Gates Quick-Lok Direct (QLD) connection, designed for working pressures up to 500 psi (35 bar), can also employ the various embodiments of the present disclosure. QLD is a releasable connection allowing for direct-to-port applications, and is perfectly suited for embodiments of the present disclosure. They cannot be unintentionally disconnected, providing an inherent safety feature. Also, the connections require minimal force and no tools to make the threadless connection. An advantage of paring the embodiments of the present disclosure with both the QLD and the QLH is a torque-free assembly, resulting in superior leak-free performance combined with a low-profile, easy to access and maintain system.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Furthermore, even though this disclosure is directed to hydraulic systems, the systems and methods disclosed herein may be used in other systems, including air and other systems. Accordingly, the appended claims are intended to include within their scope such processes, machines, manufacture, compositions of matter, means, methods, or steps.

What is claimed is:

1. A generally low-profile fluid coupling adapter system, comprising:
    an insert threaded into a mating fluid port in an existing hose block, the insert comprising an inner port, a widened thread section widened relative to said inner port, and an annular clip groove;
    a clip configured to be disposed in said annular clip groove, about a quick connect stem, at least partially within a circumferential clip groove defined by said stem, said clip adapted to be received by said circumferential clip groove when said stem is coupled with said inner port, said quick connect stem adapted to be received by said insert and said fluid port; and wherein said stem comprises a main seal disposed about said stem and mating with a main seal mating surface that is defined by said fluid port, to provide a fluid tight seal between said port and said stem when said stem is coupled with said inner port; and
    a sleeve adapted to radially retain said clip compressed in said annular clip groove for removal of said stem from said inner port; wherein said sleeve is deployable between a first position, capturing the clip in the circumferential clip groove, and a second position, releasing the clip from the circumferential clip groove.

2. The coupling adapter system of claim 1, wherein said stem further comprises a resilient dust seal.

3. The coupling adapter system of claim 2, wherein said resilient dust seal biases said sleeve into said second position.

4. The coupling adapter system of claim 1, wherein said seal is disposed in a circumferential seal groove defined by said stem.

5. The coupling adapter system of claim 1, wherein said seal is an o-ring.

6. The coupling adapter system of claim 1, wherein said seal further comprises a seal backing disposed between said seal and said clip.

7. The coupling adapter system of claim 1, wherein said insert further comprises a wrenching section.

8. The coupling adapter system of claim 1, wherein said system is generally low-profile and configured to not obstruct maintenance of the system.

9. A generally low-profile fluid coupling adapter system, comprising:
    an insert adapted to be threaded into a mating fluid port in an existing hose block, the insert comprising a widened thread section widened relative to said fluid port, an inner port, and an annular clip groove;
    a clip configured to be disposed in said annular clip groove, about a quick connect stem, at least partially within a circumferential clip groove defined by said stem, said clip adapted to be received by said circumferential clip groove when said stem is coupled with said inner port, said quick connect stem adapted to be received by said insert and said fluid port; and
    wherein the hose block comprises a main seal disposed about the interior surface of the fluid port in said hose block and adapted to mate with said stem, to provide a fluid tight seal between said fluid port and said stem when said stem is coupled with said inner port; and
    a sleeve adapted to radially retain said clip compressed in said annular clip groove for removal of said stem from said inner port; wherein said sleeve is deployable between a first position, capturing the clip in the circumferential clip groove, and a second position, releasing the clip from the circumferential clip groove.

10. A coupling adapter system, comprising an insert, a mating fluid port in an existing block, and a stem:
    said insert adapted to be threaded into said port, said port being generally tapered, said insert further adapted to receive said stem; said stem configured to engage said insert, and further configured to pass generally through said insert to allow fluid passage into an existing fluid orifice of said port in said block;
    said taper of said port comprising a narrowing ramp that extends into the existing fluid orifice, said ramp decreasing in diameter as the ramp extends into the orifice effecting a decreasing orifice diameter, wherein said decrease in orifice diameter acts as a stop for said stem; and
    wherein said insert is generally entirely within said block; and
    wherein said insert comprises an inner port and an annular clip groove.

11. The coupling adapter system of claim 10, wherein said stem comprises a circumferential clip groove, said circumferential clip groove being configured to at least partially receive a clip, wherein said clip is adapted to be received by said circumferential clip groove when said stem is coupled with said block.

12. The coupling adapter system of claim 10, wherein said system comprises only one seal.

13. A coupling adapter system, comprising an insert, a mating fluid port in an existing block, and a stem:
    said insert adapted to be threaded into said port, said port being generally tapered, said insert further adapted to receive said stem; said stem configured to engage said insert, and further configured to pass generally through said insert to allow fluid passage into an existing fluid orifice of said port in said block;
    said taper of said port comprising a narrowing ramp that extends into the existing fluid orifice, said ramp decreasing in diameter as the ramp extends into the orifice effecting a decreasing orifice diameter, wherein said decrease in orifice diameter acts as a stop for said stem; and
    wherein said insert is generally entirely within said block; and
    said coupling adapter system further comprising a main seal disposed about said stem and adapted to mate with a main seal mating surface that is defined by said fluid port, to provide a fluid tight seal between said port and said stem when said stem is coupled with said inner port.

14. A coupling adapter system, comprising an insert, a mating fluid port in an existing block, and a stem:
    said insert adapted to be threaded into said port, said port being generally tapered, said insert further adapted to receive said stem; said stem configured to engage said insert, and further configured to pass generally through said insert to allow fluid passage into an existing fluid orifice of said port in said block;
    said taper of said port comprising a narrowing ramp that extends into the existing fluid orifice, said ramp decreasing in diameter as the ramp extends into the orifice effecting a decreasing orifice diameter, wherein said decrease in orifice diameter acts as a stop for said stem; and wherein said insert is generally entirely within said block; and said coupling adapter system further comprising a sleeve disposed about said stem and adjacent said clip, configured to allow disconnecting said stem from said system.

15. A coupling adapter system, comprising an insert, a mating fluid port in an existing block, and a stem:

said insert adapted to be threaded into said port, said port being generally tapered, said insert further adapted to receive said stem; said stem configured to engage said insert, and further configured to pass generally through said insert to allow fluid passage into an existing fluid orifice of said port in said block;

said taper of said port comprising a narrowing ramp that extends into the existing fluid orifice, said ramp decreasing in diameter as the ramp extends into the orifice effecting a decreasing orifice diameter, wherein said decrease in orifice diameter acts as a stop for said stem; and wherein said insert is generally entirely within said block; and said coupling adapter system further comprising a main seal disposed between the interior of said insert and said stem.

\* \* \* \* \*